(12) United States Patent
Takeuchi et al.

(10) Patent No.: US 12,480,820 B2
(45) Date of Patent: Nov. 25, 2025

(54) TEMPERATURE SENSOR ELEMENT AND METHOD FOR MANUFACTURING TEMPERATURE SENSOR ELEMENT

(71) Applicant: SHIBAURA ELECTRONICS CO., LTD., Saitama (JP)

(72) Inventors: Akitaka Takeuchi, Saitama (JP); Naohiro Niizeki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 449 days.

(21) Appl. No.: 17/628,500

(22) PCT Filed: Sep. 17, 2020

(86) PCT No.: PCT/JP2020/035269
§ 371 (c)(1),
(2) Date: Jan. 19, 2022

(87) PCT Pub. No.: WO2021/065541
PCT Pub. Date: Apr. 8, 2021

(65) Prior Publication Data
US 2022/0283037 A1    Sep. 8, 2022

(30) Foreign Application Priority Data

Oct. 3, 2019   (JP) .................. 2019-182795

(51) Int. Cl.
*G01K 1/10* (2006.01)
*C04B 35/505* (2006.01)
(Continued)

(52) U.S. Cl.
CPC .............. *G01K 1/10* (2013.01); *C04B 35/505* (2013.01); *G01K 7/22* (2013.01); *H01C 1/032* (2013.01);
(Continued)

(58) Field of Classification Search
CPC .......... G01K 1/10; G01K 7/22; C04B 35/505; C04B 2235/3206; C04B 2235/3217;
(Continued)

(56) References Cited

U.S. PATENT DOCUMENTS 9,714,869 B2 * 7/2017 Satou ...................... G01K 7/02
2011/0273265 A1  11/2011 Fujita et al.
(Continued)

FOREIGN PATENT DOCUMENTS

CN    102300829 A    12/2011
CN    102869966 A    1/2013
(Continued)

OTHER PUBLICATIONS

WO_2004088261_A1 (Year: 2004).*
(Continued)

*Primary Examiner* — John E Breene
*Assistant Examiner* — Janice M Soto
(74) *Attorney, Agent, or Firm* — McDonald Hopkins LLC (57) ABSTRACT

A temperature sensor element includes: an element main body including a heat sensitive body including a thermistor sintered body of which the electrical characteristics change with temperature, and a pair of lead wires that is connected to the heat sensitive body through electrodes; and a protective layer that protects the heat sensitive body. The protective layer has an inner protective layer covering the heat sensitive body and an outer protective layer covering the outer side of the inner protective layer. The inner protective layer is formed of an aggregate of particles that are chemically stable with respect to the thermistor sintered body and made of non-metal.

11 Claims, 6 Drawing Sheets

(51) Int. Cl.
*G01K 7/22* (2006.01)
*H01C 1/032* (2006.01)
*H01C 7/04* (2006.01)

(52) U.S. Cl.
CPC ........ *H01C 7/04* (2013.01); *C04B 2235/3206* (2013.01); *C04B 2235/3217* (2013.01); *C04B 2235/3225* (2013.01); *C04B 2235/3241* (2013.01); *C04B 2235/3244* (2013.01); *C04B 2235/3263* (2013.01); *C04B 2235/3289* (2013.01); *C04B 2235/3418* (2013.01); *C04B 2235/386* (2013.01); *C04B 2235/3865* (2013.01); *C04B 2235/442* (2013.01)

(58) Field of Classification Search
CPC .... C04B 2235/3225; C04B 2235/3241; C04B 2235/3244; C04B 2235/3263; C04B 2235/3289; C04B 2235/3418; C04B 2235/386; C04B 2235/3865; C04B 2235/442; H01C 1/032; H01C 7/04; H01C 17/02; H01C 1/148; H01C 7/023; H01C 17/28; H01C 1/142; H01C 7/043; H01C 1/028; H01C 7/008; H01C 17/00
See application file for complete search history.

(56) References Cited

U.S. PATENT DOCUMENTS

2013/0223479 A1 8/2013 Satou et al.
2017/0301437 A1* 10/2017 Yamaguchi ............ H01C 7/008
2018/0374614 A1 12/2018 Iwase
2021/0215549 A1 7/2021 Suzuki

FOREIGN PATENT DOCUMENTS

| | | | |
|---|---|---|---|
| CN | 103398795 B | | 9/2015 |
| CN | 108369845 A | | 8/2018 |
| CN | 109073480 A | | 12/2018 |
| DE | 102018102132 B3 | | 1/2019 |
| JP | 60-136202 A | | 7/1985 |
| JP | 2006-54258 A | | 2/2006 |
| JP | 2009-115789 A | | 5/2009 |
| JP | 2012052959 A | * | 3/2012 |
| JP | 4990256 B2 | | 8/2012 |
| JP | 5049879 B2 | | 10/2012 |
| WO | WO-2004088261 A1 | * | 10/2004 ............... G01K 1/18 |

OTHER PUBLICATIONS

Supplementary European Search Report for EP20872845 dated Aug. 8, 2022.
Translation of the Written Opinion of the International Searching Authority for PCT/JP2020/035269 dated Apr. 5, 2022.
International Search Report issued in Application No. PCT/JP2020/035269, dated Dec. 8, 2020.
Written Opinion issued in Application No. PCT/JP2020/035269, dated Dec. 8, 2020.
Office action for Chinese application No. 202080045985.3 issued Dec. 15, 2022.

* cited by examiner

TEMPERATURE SENSOR ELEMENT AND METHOD FOR MANUFACTURING TEMPERATURE SENSOR ELEMENT

CROSS-REFERENCE TO RELATED APPLICATIONS

This is a National Stage application of PCT international application PCT/JP2020/035269, filed on Sep. 17, 2020 which claims priority from Japanese Patent Application No. 2019-182795, filed on Oct. 3, 2019, the contents of which are incorporated herein by reference in their entireties.

TECHNICAL FIELD

The present invention relates to a temperature sensor element including a thermistor as a heat sensitive body, and particularly to a temperature sensor element that exhibits a low rate of change in the electrical resistance value in a high-temperature reducing atmosphere.

BACKGROUND ART

Conventionally, temperature sensors using a thermistor of which the electrical resistance value (hereinafter simply "resistance value") changes with temperature as a heat sensitive body have been widely used. The characteristics of a thermistor are generally represented by the resistance value and a temperature coefficient of resistance (dependence of the resistance value on temperature).

Such a temperature sensor includes, as a minimum unit, a temperature sensor element that includes a thermistor as a heat sensitive body, electrodes formed on surfaces of the thermistor, and lead wires joined to the electrodes. Usually, this temperature sensor element is not used with the thermistor exposed to outside air, and the thermistor is covered with some kind of protective layer. As one example, a protective layer made of glass is provided to protect the thermistor from an environment where the temperature sensor is used. For example, when measuring a temperature in a reducing atmosphere, if the thermistor that is an oxide sintered body is reduced, the electrical characteristics of the thermistor change. Then, after the reduction, a temperature measurement result different from that before the reduction is output even when the temperature is the same.

Patent Literature 1 and Patent Literature 2 propose solutions to a problem with this protective layer made of glass. As there is a difference in the coefficient of linear expansion between the thermistor and the lead wires, the coefficient of linear expansion of the glass forming the protective layer cannot be matched with both the coefficient of linear expansion of the thermistor and the coefficient of linear expansion of the lead wires. If there is a difference between the coefficient of linear expansion of the glass and the coefficient of linear expansion of the thermistor, the thermistor is subjected to thermal stress, so that the electrical characteristics of the thermistor element, typically the resistance value changes, which may make correct temperature measurement difficult.

Therefore, Patent Literature 1 and Patent Literature 2 propose temperature sensors having an inner protective layer that seals the thermistor along with portions of the lead wires, and an outer protective layer. As the inner protective layer, one obtained by adding thermistor powder to crystallized glass is illustrated. As the outer protective layer, one obtained by adding yttrium oxide ($Y_2O_3$) to crystallized glass is illustrated.

CITATION LIST

Patent Literature

Patent Literature 1: JP 4990256 B2
Patent Literature 2: JP 5049879 B2

SUMMARY OF INVENTION

Technical Problem

According to the proposals of Patent Literature 1 and Patent Literature 2, temperature sensors that exhibit excellent thermal responsiveness and lead wire sealing performance even in a reducing atmosphere of a high temperature, for example, 1000° C. or higher, are provided.

However, it is required to be able to measure temperature with high accuracy for a longer period of time even in such a harsh environment. Therefore, the present invention aims to provide a temperature sensor element that exhibits a stable electrical resistance value even when continuously used in a high-temperature reducing atmosphere.

Solution to Problem

A temperature sensor element of the present invention includes: a heat sensitive body including a thermistor sintered body of which the electrical characteristics change with temperature; a pair of lead wires connected to the heat sensitive body through electrodes; and a protective layer covering the heat sensitive body.

The protective layer in the present invention has an inner protective layer covering the heat sensitive body and an outer protective layer covering the outer side of the inner protective layer.

The inner protective layer in the present invention is formed of an aggregate of particles that are chemically stable with respect to the thermistor sintered body and made of non-metal.

In the present invention, it is preferable that the filling rate of the particles in the aggregate of the inner protective layer be 88% or less.

In the present invention, it is preferable that the aggregate of the inner protective layer include one or two or more of oxide particles, carbide particles, nitride particles, and boride particles.

In the present invention, it is preferable that the aggregate of the inner protective layer include thermistor particles having the same composition as the thermistor sintered body.

The present invention provides a manufacturing method of a temperature sensor element including a heat sensitive body including a thermistor sintered body of which the electrical characteristics change with temperature, a pair of lead wires connected to the heat sensitive body through electrodes, and a protective layer covering the heat sensitive body.

The manufacturing method of a temperature sensor element of the present invention includes a first step of providing an inner protective layer that covers the heat sensitive body, and a second step of providing an outer protective layer that covers the outer side of the inner protective layer.

In the first step in the present invention, the inner protective layer formed of an aggregate of particles that are chemically stable with respect to the thermistor sintered body and made of non-metal is provided.

Advantageous Effects of Invention

According to the temperature sensor element of the present invention, the inner protective layer is formed of an aggregate of particles that are chemically stable with respect to the thermistor sintered body and made of non-metal, so that a stable electrical resistance value can be obtained even when the temperature sensor element is used in a harsh high-temperature environment.

DESCRIPTION OF EMBODIMENT

A temperature sensor element 1 according to one embodiment of the present invention will be described with reference to the drawings.

Figure 1:
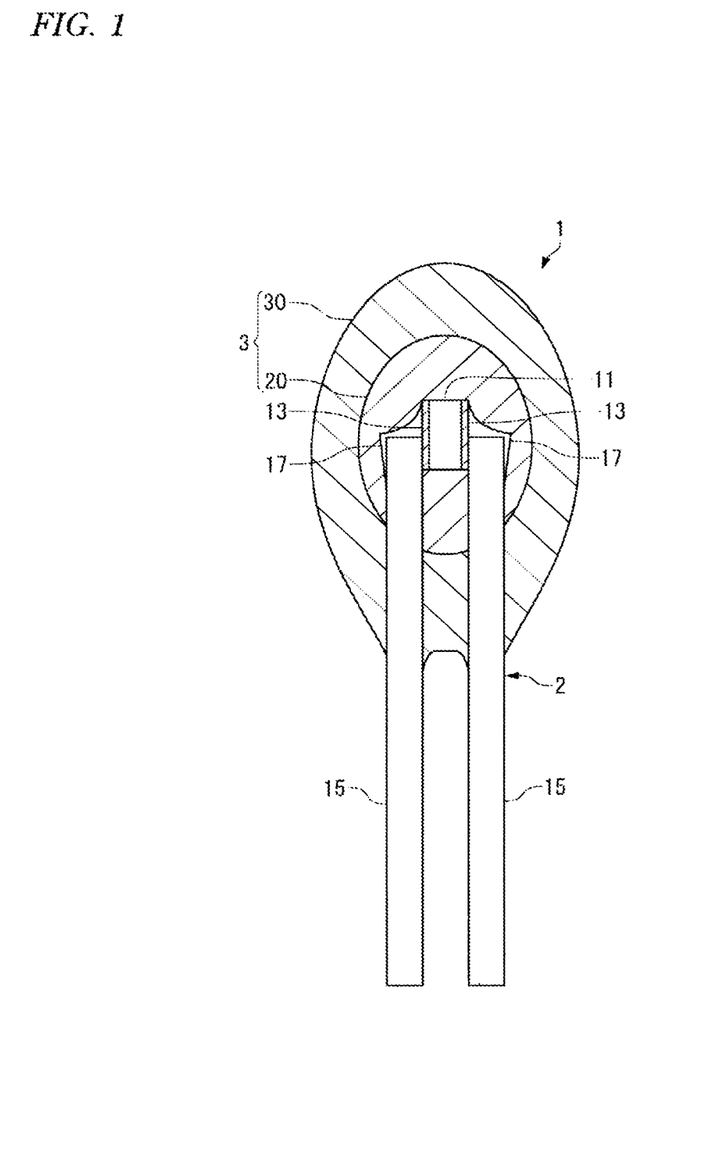
FIG. 1 is a sectional view showing a simplified configuration of a temperature sensor element according to an embodiment.

As shown in FIG. 1, the temperature sensor element 1 according to the embodiment includes an element main body 2 and a protective layer 3. The element main body 2 includes: a heat sensitive body 11 of which the electrical characteristics, for example, the electrical resistance value changes with temperature; a pair of electrodes 13, 13 formed on opposite side surfaces of the heat sensitive body 11; a pair of lead wires 15, 15 connected to the respective electrodes 13, 13; and a pair of connection electrodes 17, 17 connecting the electrodes 13, 13 and the lead wires 15, 15 to each other. The protective layer 3 includes an inner protective layer 20 as a protective layer that covers the heat sensitive body 11 along with portions of the lead wires 15, 15, and an outer protective layer 30 that covers the outer side of the inner protective layer 20.

By including a configuration characteristic of the inner protective layer 20, the temperature sensor element 1 can maintain a low rate of change in the electrical resistance value even in an atmosphere containing hydrogen.

The temperature sensor element 1 may be used by being housed inside a protective tube made of metal that has excellent resistance to heat and oxidation, such as stainless steel or an Ni-based superalloy, while the specifics will not be described here.

In the following, each component of the temperature sensor element 1 will be described, and then the workings and effects of the temperature sensor element 1 will be described.

[Heat Sensitive Body 11]

As the heat sensitive body 11, a thermistor sintered body is used. "Thermistor" is an abbreviation for "thermally sensitive resistor," and is a metal oxide that measures temperature using the resistance value changing with temperature.

Thermistors are divided into two types, negative temperature coefficient (NTC) thermistors and positive temperature coefficient (PTC) thermistors, and the present invention can be used for either type of thermistor.

An oxide sintered body composed basically of manganese oxide ($Mn_3O_4$) having a spinel structure, which is typical for an NTC thermistor, can be used as the heat sensitive body 11. An oxide sintered body having a composition of $M_xMn_{3-x}O_4$ obtained by adding an M element (one or two or more of among Ni, Co, Fe, Cu, Al, and Cr) to this basic composition can be used as the heat sensitive body 11. Further, one or two or more of V, B, Ba, Bi, Ca, La, Sb, Sr, Ti, and Zr can be added.

A composite oxide having a perovskite structure, which is typical for an NTC thermistor, for example, an oxide sintered body composed basically of $YCrO_3$ can be used as the heat sensitive body 11.

As the most typical NTC thermistor, a sintered body can be named which includes a $Y_2O_3$ phase and a $Y(Cr, Mn)O_3$ phase, and of which the chemical composition of Cr, Mn, Ca, and Y except for oxygen is Cr: 3 to 9 mol %, Mn: 5 to 15 mol %, Ca: 1 to 8 mol %, with the balance being inevitable impurities and Y.

[Manufacturing Method of Thermistor Sintered Body]

The heat sensitive body 11 formed of a thermistor sintered body is manufactured by going through the processes of weighing raw material powders, mixing the raw material powders, drying and calcining the raw material powders, and mixing and pulverizing after calcination, drying and granulating, and compacting and sintering. In the following, each process will be described using the above-described most typical thermistor sintered body as an example.

[Weighing Raw Material Powders]

Raw material powders including an Yttrium oxide ($Y_2O_3$) powder, a chrome oxide ($Cr_2O_3$) powder, a manganese oxide (MnO, $Mn_2O_3$, $Mn_3O_4$, etc.) powder, and a calcium carbonate ($CaCO_3$) powder are weighed to form the aforementioned chemical composition.

In this embodiment, a powder is formed of multiple particles.

The $Y_2O_3$ powder contributes to formation of the $Y_2O_3$ phase, and the $Y_2O_3$ powder, the $Cr_2O_3$ powder, and the manganese oxide powder ($Mn_3O_4$ powder) contribute to formation of the $Y(Cr, Mn)O_3$ phase. In addition to functioning as a sintering aid, the $CaCO_3$ powder contributes to lowering the B-constant. The B-constant is a physical property value representing the sensitivity (the ratio of change in the resistance value) of the thermistor relative to temperature changes.

To obtain a thermistor sintered body with stable characteristics, powders with a purity of 98% or higher, preferably 99% or higher, and more preferably 99.9% or higher are used as the raw material powders.

The particle size of the raw material powder is not limited as long as calcination proceeds, but can be selected within a range of 0.1 to 6.0 μm in terms of the average particle size (d50).

[Mixing Raw Material Powders; Ball Mill]

The $Y_2O_3$ powder, the $Cr_2O_3$ powder, the $Mn_3O_4$ powder, and the $CaCO_3$ powder having been weighed to the predetermined amounts are mixed together. The mixing can be performed, for example, by a procedure of converting the mixed powder into a slurry state by addition of water, and mixing the slurry by a ball mill. For the mixture, a mixer other than a ball mill can also be used.

[Drying Raw Material Powders]

It is preferable that the slurry having been mixed be dried and granulated by a spray dryer or other device into a powder mixture for calcination.

[Calcination]

The powder mixture for calcination having been dried is calcined. By the calcination, a calcined body having a composite structure of the $Y_2O_3$ phase and the $Y(Cr, Mn)O_3$ phase is obtained from the $Y_2O_3$ powder, the $Cr_2O_3$ powder, the $Mn_3O_4$ powder, and the $CaCO_3$ powder.

The calcination is performed by feeding the powder mixture for calcination into a crucible, for example, and holding the powder mixture within a temperature range of 800 to 1300° C. in the air. If the temperature of calcination is lower than 800° C., the formation of the composite structure is insufficient, and if the temperature of calcination exceeds 1300° C., there is a possibility that the sintering density decreases and the stability of the resistance value decreases. Therefore, the holding temperature for calcination should be set within the range of 800 to 1300° C.

The holding time period in the calcination should be appropriately set according to the holding temperature, but when the holding temperature is in the aforementioned temperature range, the purpose of the calcination can be achieved by a holding time period of about 0.5 to 100 hours.

[Mixing and Pulverizing; Ball Mill]

The powder after the calcination is mixed and pulverized. The mixture and pulverization can be performed by a procedure of converting the powder after the calcination into a slurry state by addition of water, and mixing the slurry by a ball mill, in the same manner as in the procedure before the calcination.

[Drying and Granulation]

It is preferable that the powder having been pulverized be dried and granulated by a spray dryer or other device.

[Compacting]

The granulated powder after the calcination is compacted into a predetermined shape.

For compacting, press compacting with the use of a die, and besides a cold isostatic press (CIP) can be used.

The higher the density of the compacted body is, the higher density of a sintered body easily obtains; and accordingly, it is desirable to enhance the density of the compacted body as much as possible. For that purpose, it is preferable to use CIP which can obtain the high density.

[Sintering]

Next, the obtained compacted body is sintered.

The sintering is performed by a procedure of holding the temperature range of 1400 to 1650° C. in the air. If the sintering temperature is lower than 1400° C., the formation of the composite structure is insufficient; and if the sintering temperature exceeds 1650° C., the sintered body melts, and/or a reaction occurs with a sintering crucible and/or the like. The holding time period in the sintering should be appropriately set according to the holding temperature, but when the holding temperature is in the above temperature range, a dense sintered body can be obtained by a holding time period of approximately 0.5 to 200 hours.

It is preferable to subject the obtained thermistor sintered body to annealing, in order to stabilize the characteristics of the thermistor. The thermistor sintered body is annealed by being held, for example, at 1000° C. in the air.

[Electrodes 13, 13 and Connection Electrodes 17, 17]

As shown in FIG. 1, the electrodes 13, 13 are respectively formed into a film shape on the whole areas of both top and bottom surfaces of the plate-shaped heat sensitive body 11. The electrodes 13, 13 are formed from platinum (Pt) or other noble metal.

The electrodes 13, 13 are each formed as a thick film or a thin film. The thick film electrodes 13, 13 are formed by applying a paste which has been produced by mixing an organic binder with a platinum powder onto both of the top and bottom surfaces of the thermistor sintered body, and by drying and then sintering the paste. Thin film electrodes can be formed by vacuum vapor deposition or sputtering.

The heat sensitive body 11 with the electrodes 13, 13 formed thereon is processed into a predetermined dimension.

The connection electrodes 17, 17 are formed of metal films that are formed on the surfaces of the respective electrodes 13, 13. The connection electrodes 17, 17 are also formed from platinum (Pt) or other noble metal.

[Lead Wires 15, 15]

As shown in FIG. 1, one end sides of the lead wires 15, 15 are electrically and mechanically connected to the electrodes 13, 13 through the connection electrodes 17, 17, respectively. The other end sides of the lead wires 15, 15 are connected to an external detection circuit. The lead wires 15, 15 are formed of a heat-resistant wire material formed from, for example, platinum or an alloy of platinum and iridium (Ir).

The lead wires 15, 15 are connected to the electrodes 13, 13, in the following way.

A paste containing a platinum powder which will form the connection electrodes 17, 17 is applied in advance to each of one end sides of the lead wires 15, 15. The platinum paste is dried in a state where the respective sides of the lead wires 15, 15, on which the platinum paste has been applied, are brought into contact with the electrodes 13, 13, and then the platinum powder is sintered.

[Inner Protective Layer 20]

Next, the inner protective layer 20 that is a feature of the embodiment will be described.

The main function of the inner protective layer 20 is to serve as a buffer material that relieves stress caused by thermal expansion of the outer protective layer 30 from being directly applied to the heat sensitive body 11. In other words, the inner protective layer 20 bears thermal stress from the outer protective layer 30.

Further, the inner protective layer 20 functions to realize stable electrical and mechanical connection by fixing joints between the heat sensitive body 11 and the lead wires 15, 15.

The inner protective layer 20 according to the embodiment is formed of an aggregate of particles. This aggregate does not contain glass that is contained in conventional inner protective layers, which enhances the function of bearing thermal stress. However, the inner protective layer 20 according to the embodiment is different from conventional inner protective layers containing glass in its thermal stress bearing effect. Specifically, an inner protective layer containing glass bears thermal stress by securing its rigidity, whereas the inner protective layer 20 according to the embodiment bears thermal stress as the particles forming the aggregate undergo positional shift relatively to one another.

The particles forming the aggregate in the inner protective layer 20 preferably meet the following conditions. Condition 1: Being chemically stable with respect to the heat sensitive body 11.

The particles forming the aggregate are required to be chemically stable with respect to the heat sensitive body 11

(e.g., a thermistor sintered body). This is to maintain the desired characteristics of the heat sensitive body 11. Being chemically stable is required especially when the inner protective layer 20 is heated to a high temperature in a sintering process for forming the outer protective layer 30. It is required also when the temperature sensor element 1 actually measures high temperatures like over 1000° C.

Condition 2: Being made of a non-metal material.

The inner protective layer 20 as an aggregate of particles comes into direct contact with the heat sensitive body 11. If this aggregate is made of a metal material having electrical conductivity, it causes a leak of electricity on contact with the electrodes 13, 13 of the heat sensitive body 11 and the lead wires, thereby making temperature measurement impossible.

As suitable materials meeting these Condition 1 and Condition 2, metallic elements, and oxides, carbides, nitrides, and borides of metalloid elements can be named.

Metallic elements are a concept specifically including alkali metal elements, alkaline earth metal elements, transition metal elements, base metal elements, and lanthanoid elements. Among these elements, preferred elements are as follows:

Mg, Al, Si, Ti, Cr, Mn, Fe, Co, Ni, Zn, Ge, Sr, Y, Zr, Nb, Mo, Ce, Pr, Nd, Sm, Eu, Gd, Tb, Er, Yb, Lu, Hf, Ta, W.

As suitable materials other than oxides, carbides, nitrides, and borides that meet the above Condition 1 and Condition 2, organic substances, for example, resin materials can also be named. However, in the case of an organic substance, since the melting point is low compared with that of a metal element, an oxide of a metalloid element, or the like, using an organic substance as the inner protective layer 20 puts a limit on the range of temperatures measured by the temperature sensor element 1.

Containing no glass, the inner protective layer 20 has difficulty maintaining its shape by itself; therefore, the outer protective layer 30 solely assumes the role of maintaining the shape. Specifically, the outer protective layer 30 is formed around the inner protective layer 20, and in a state where no external force is applied, the outer protective layer 30 holds the inner protective layer 20, thereby allowing the inner protective layer 20 to maintain its shape without containing glass.

Further, at some part, particles forming the inner protective layer 20 are joined together as elements are diffused between adjacent particles during sintering of the outer protective layer 30, which can contribute to maintaining the inner protective layer 20 along with holding by the outer protective layer 30. However, this joint between adjacent particles need not be firm. Rather, it is preferable that the joint between adjacent particles be weak from the viewpoint of the stress relieving effect of the inner protective layer 20. Diffusion of elements between adjacent particles occurs during heat treatment of the outer protective layer 30.

Compared with the thermistor sintered body forming the heat sensitive body 11, the inner protective layer 20 containing no glass has a low density of about equal to or less than 60% of that of the thermistor sintered body. Further, compared with the thermistor sintered body, it has a higher resistance value than the thermistor sintered body.

Since the inner protective layer 20 is formed of an aggregate of particles, its coarseness or denseness can be evaluated as a filling rate. When densest filling is assumed as a reference, the filling rate of particles in the inner protective layer 20 is about 88% at a maximum.

Figure 2A:
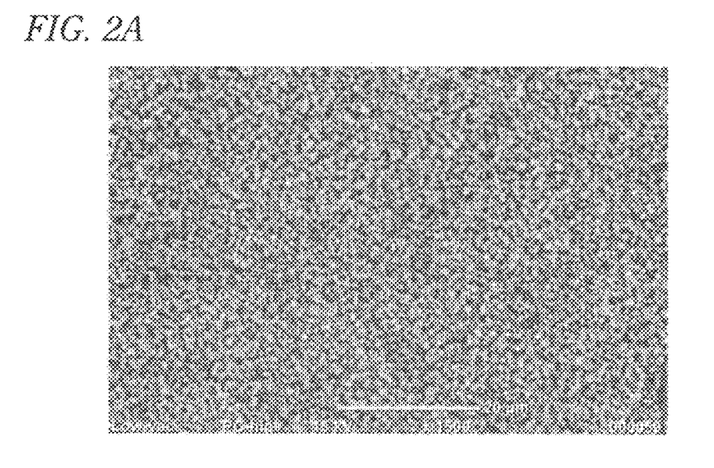
FIG. 2A shows a photograph of the microstructure of an inner protective layer according to the embodiment that does not contain glass.
Figure 2B:
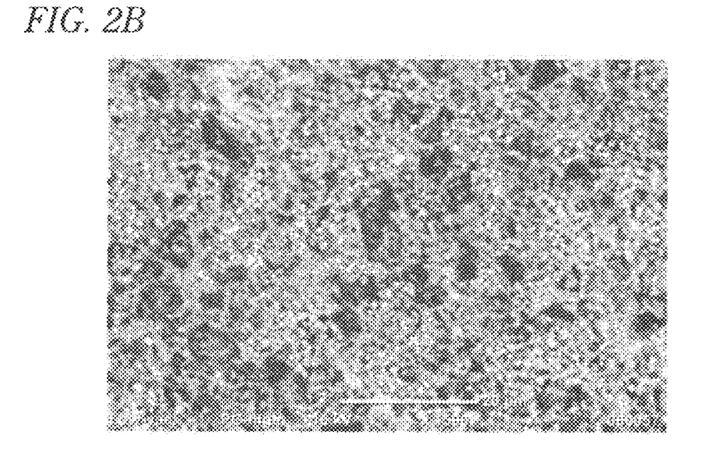
FIG. 2B shows a photograph of the microstructure of an inner protective layer that contains glass.

Here, FIG. 2A shows a photograph of the microstructure of the inner protective layer according to the embodiment that does not contain glass, and FIG. 2B shows a photograph of the microstructure of a conventional inner protective layer that contains glass. FIG. 2A corresponds to Example (specimen No. 1) to be described later, and FIG. 2B corresponds to a conventional example (specimen No. 8) to be described later.

Since the inner protective layer according to the embodiment of FIG. 2A that does not contain glass is not sintered, the density thereof is low compared with that of the sintered body forming the heat sensitive body 11.

On the other hand, an inner protective layer containing glass undergoes a process of solidification after the glass is melted, which provides it with the strength to fix the heat sensitive body (11) and the lead wires (15, 15). An inner protective layer containing glass has a fixing force in proportion to the content of glass. Thus, an external force is more likely to be transmitted, and when used at high temperature, the heat sensitive body is subjected to relatively high thermal stress from an internal force based on the difference in the coefficient of linear expansion between the members.

Figure 3A:
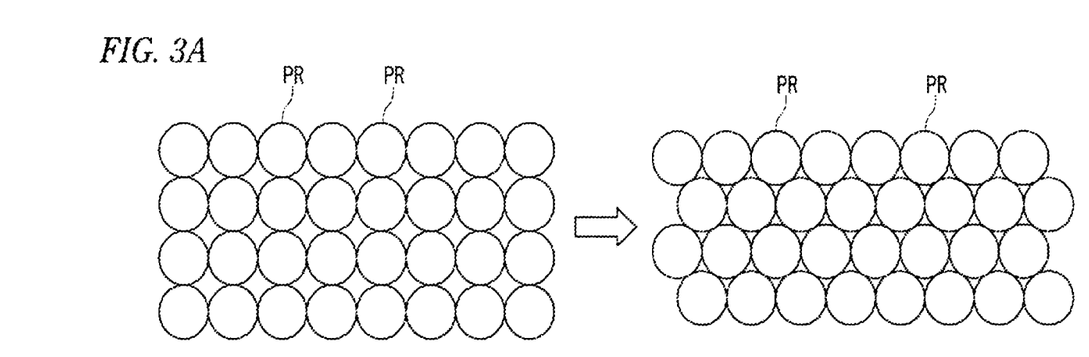
FIGS. 3A and 3B are views each illustrating a thermal stress bearing effect of the inner protective layer according to the embodiment.

In the inner protective layer 20 according to the embodiment, as it is an aggregate of particles, when subjected to stress resulting from thermal expansion of the outer protective layer 30, adjacent particles PR can undergo positional shift relatively to one another as shown in FIG. 3A, which can relieve the stress applied.

Figure 3B:
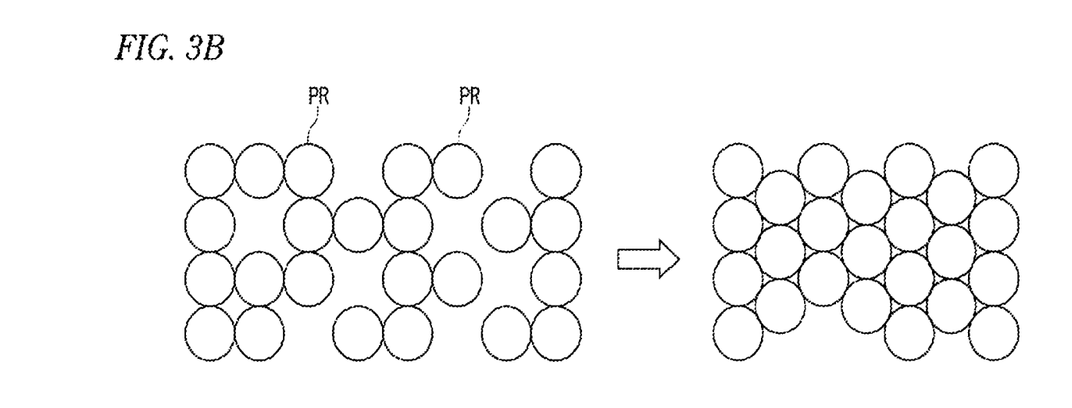

The inner protective layer 20 containing no glass has a low density of equal to or less than 60% or that of the thermistor sintered body. The low-density inner protective layer 20 is preferable for relieving the stress resulting from thermal expansion of the outer protective layer 30. That is, as shown in FIG. 3B, having a low density means having a wide margin for shrinking when subjected to stress. Accordingly, when subjected to stress from the outer protective layer 30, the inner protective layer 20 can relieve more stress by shrinking as a whole.

[Outer Protective Layer 30]

Next, the outer protective layer 30 will be described.

The outer protective layer 30 functions to air-tightly seal the heat sensitive body 11 and the inner protective layer 20 from the surrounding atmosphere. Further, the outer protective layer 30 functions to hold the form of the inner protective layer 20 in which particles are not joined together or joined together only with low joining force. In addition, the outer protective layer 30 functions to protect the heat sensitive body 11 along with the inner protective layer 20 from external force.

The outer protective layer 30 is preferably formed of the same mixture of glass and an oxide powder as the inner protective layer 20. As the oxide powder, aluminum oxide ($Al_2O_3$), magnesium oxide (MgO), yttrium oxide ($Y_2O_3$), chrome oxide ($Cr_2O_3$), zirconium oxide ($ZrO_2$), or a powder having the same composition as that of the thermistor sintered body forming the heat sensitive body 11 can be used.

While one or both of crystallized glass and amorphous glass can be used as the glass forming the outer protective layer 30, it is preferable that crystallized glass that is stable at high temperatures be used. As crystallized glass, for example, a composition of $SiO_2$: 30 to 60% by weight, CaO: 10 to 30% by weight, MgO: 5 to 25% by weight, and $Al_2O_3$: 0 to 15% by weight can be used.

Also for the outer protective layer 30, as with the inner protective layer 20, an organic substance, for example, a thermosetting resin, such as an epoxy resin, can be used.

[Relationship of Rate of Linear Expansion]

The temperature sensor element 1 in the embodiment may be used, for example, in a range of temperatures from room temperature to 1000° C.

Then, in this temperature range, thermal stress that occurs between the heat sensitive body 11 and the inner protective layer 20 that directly covers the heat sensitive body 11 needs to be suppressed. This is to suppress changes in the electrical characteristics, particularly the resistance value, of the heat sensitive body 11.

Further, in this temperature range, it is required to suppress formation of a gap between the outer protective layer 30 that covers the inner protective layer 20 and seals the lead wires 15, 15, and the lead wires 15, 15. This is to prevent a reducing gas and other corrosive gases from penetrating to the heat sensitive body 11 and thereby prevent changes in the electrical characteristics, particularly the resistance value, of the heat sensitive body 11. The other corrosive gases refer to hydrogen sulfide, sulfurous acid, nitrous acid, chlorine, ammonia, etc.

To meet these requirements, it is necessary to adjust the coefficients of linear expansion of the heat sensitive body 11, the lead wires 15, 15, and the outer protective layer 30 that constitute parts of the temperature sensor element 1. That is, it is desirable that the coefficient of linear expansion ($\alpha 30$) of the outer protective layer 30 be made higher than the coefficient of linear expansion ($\alpha 11$) of the heat sensitive body 11 and be made close to the coefficient of linear expansion ($\alpha 15$) of the lead wire 15. Specifically, the difference between the coefficient of linear expansion $\alpha 30$ and the coefficient of linear expansion $\alpha 15$ is adjusted to preferably $5 \times 10^{-7}$/K or less, and more preferably $3 \times 10^{-7}$/K or less.

The coefficients of linear expansion of the above-described thermistor sintered body forming the heat sensitive body 11, platinum, for example, forming the lead wire 15, glass, and oxides are as shown below. It is desired that the ratio between the glass and the oxide powder in the outer protective layer 30 be set based on these values. It is also desired that the ratio between the glass and the oxide powder be set such that the outer protective layer 30 approaches the coefficient of linear expansion $\alpha 15$ of the lead wire 15.

Heat sensitive body 11 (thermistor sintered body): $8.0 \times 10^{-6}$/K

Lead wire 15 (platinum): $8.8 \times 10^{-6}$/K

Glass: $9.1 \times 10^{-6}$/K $Y_2O_3$, $Al_2O_3$: $7.2 \times 10^{-6}$/K

CaO, MgO, $ZrO_2$: $10.5 \times 10^{-6}$/K

[Manufacturing Method of Temperature Sensor Element 1]

Next, a manufacturing method of the temperature sensor element 1 will be described.

Figure 4:
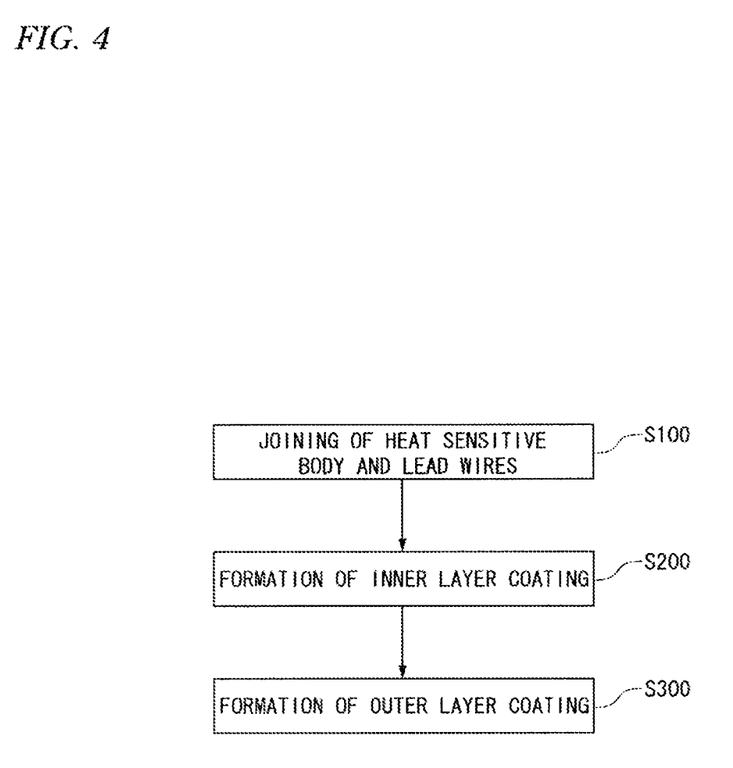
FIG. 4 is a flowchart showing a simplified manufacturing process of the temperature sensor element according to the embodiment.
Figure 5A:
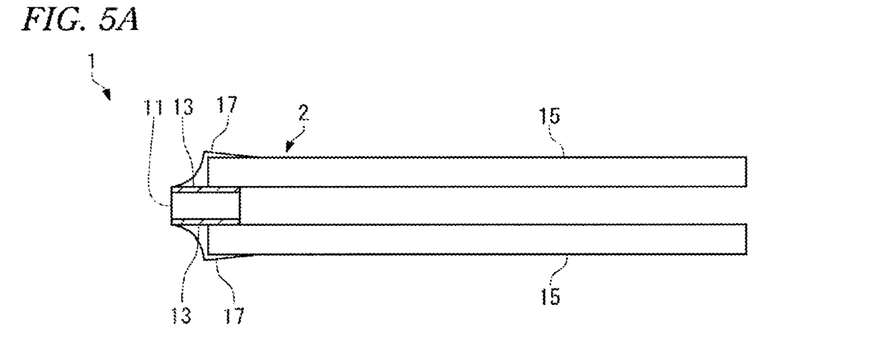
FIGS. 5A to 5C are views showing a simplified manufacturing procedure of the temperature sensor element according to the embodiment.
Figure 5B:
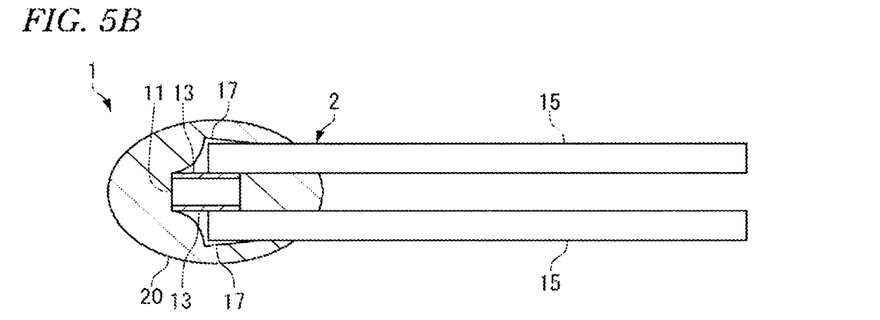
Figure 5C:
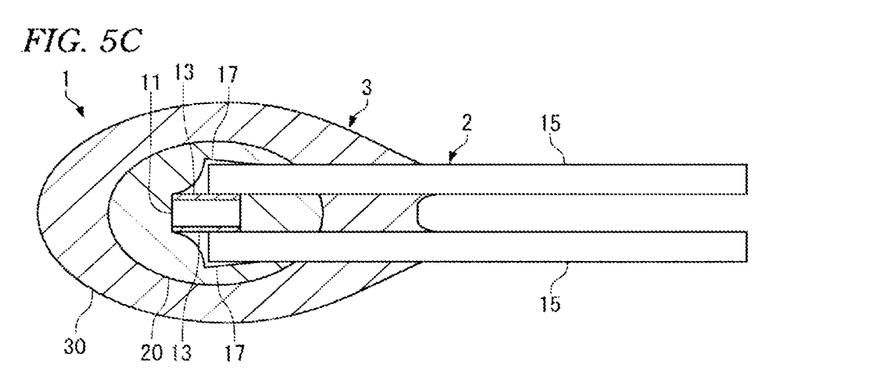

As shown in FIG. 4, FIG. 5A, FIG. 5B and FIG. 5C, the temperature sensor element 1 is manufactured by going through a step of manufacturing the element main body 2 (S100 of FIG. 4, FIG. 5A), a step of forming the inner protective layer 20 on the manufactured element main body (S200 of FIG. 4, FIG. 5B), and a step of forming the outer protective layer 30 over the inner protective layer 20 (S300 of FIG. 4, FIG. 5C).

[Inner Layer Formation Step (S200)]

The step of forming the inner protective layer 20 (S200) includes a step of forming a layer to constitute an inner layer by dipping, and a step of drying the formed layer.

For dipping, a liquid mixture for the inner protective layer including the above-described various powders, a binder powder, and a solvent is prepared.

Next, the element main body 2 is immersed in this liquid mixture from the side of the heat sensitive body 11 to which the lead wires 15, 15 are connected, to deposit a precursor, which later forms the inner protective layer 20, around the heat sensitive body 11.

When it is difficult to obtain a precursor having a required thickness and state by one dipping, dipping can be performed multiple times to obtain a precursor of the inner protective layer 20.

Figure 6A:
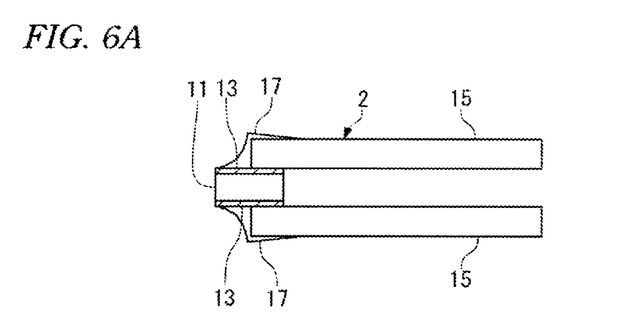
FIGS. 6A to 6C are views showing the procedure of forming the inner protective layer according to the embodiment.
Figure 6B:
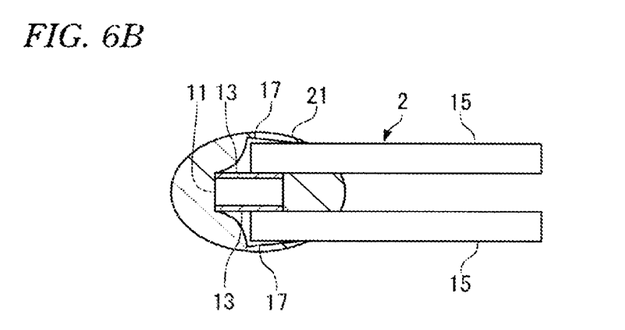
Figure 6C:
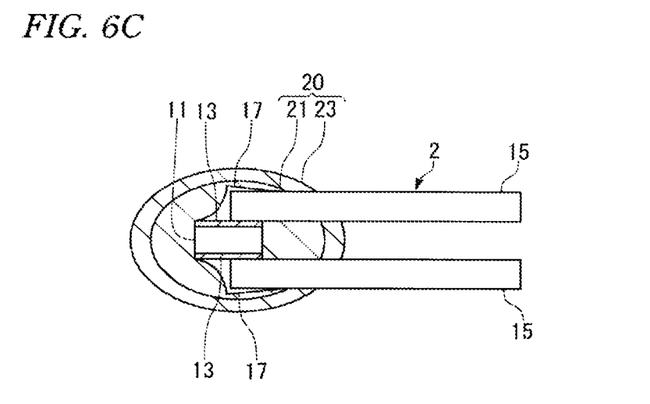

For example, FIGS. 6A, 6B, and 6C show an example of forming a precursor by performing dipping twice. By the first dipping, a first precursor layer 21 is formed (FIG. 6B), and thereafter, by the second dipping, a second precursor layer 23 is formed (FIG. 6C). One dipping can be sufficient for forming the inner protective layer 20, or dipping can also be performed three or more times.

After dipping, when the solvent is vaporized and drying is completed, a precursor of the inner protective layer 20 in which particles forming the inner protective layer 20 are bound together by the binder can be obtained. When the inner protective layer precursor is obtained, next, the process flow moves to the outer protective layer formation step (S300).

[Outer Layer Formation Step (S300)]

The step of forming the outer protective layer 30 (S300) includes a step of forming a precursor of the outer protective layer 30 by dipping, and a step of performing heat treatment on the outer layer precursor.

For dipping, a liquid mixture for the outer protective layer 30 including the above-described various powders, a binder powder, and a solvent is prepared. When the outer protective layer 30 includes glass only, a liquid mixture including a glass powder, a binder powder, and a solvent is prepared.

Next, the element main body 2 is immersed in this liquid mixture from the side of the inner protective layer 20 to deposit a precursor of the outer protective layer 30 around the inner protective layer 20.

Also for the outer protective layer 30, as with the inner protective layer 20, a precursor of the outer protective layer 30 can be formed by performing dipping once, or this precursor can also be formed by performing dipping multiple times.

After the precursor of the outer protective layer 30 is dried, crystallization and baking of the glass are performed at the same time by performing heat treatment at 1200° C., for example.

By going through each of the above processes, the temperature sensor element 1 having the inner protective layer 20 and the outer protective layer 30 can be obtained.

First Example

Next, one example of the present invention will be described based on a specific example of implementation.

Temperature sensor elements 1 each including an inner protective layer 20 and an outer protective layer 30 to be described below were produced and the rates of change in the resistance value were measured. The results are collectively shown in Table 1.

Raw material powders having the following particle sizes (d50) were mixed at the ratio shown below to prepare powder raw materials, and the heat sensitive bodies 11 were manufactured in accordance with the processes described above. The conditions for calcination were 1300° C.×24 hours and those for sintering were 1500° C.×24 hours, and both were performed in the air.

$Y_2O_3$: 79.5 mol %, particle size: 0.1 μm $Cr_2O_3$: 8.5 mol %, particle size: 2.0 μm CaCO$_3$: 3.5 mol %, particle size: 2.0 μm Mn$_3$O$_4$: 8.5 mol %, particle size: 5.0 μm The electrode 13, the lead wire 15, and the connection electrode 17 were all formed from platinum (Pt), and the element main bodies 2 were produced by the procedure described in the embodiment.

The inner protective layers 20 and the outer protective layers 30 shown in Table 1 were sequentially formed on these element main bodies 2.

Each inner protective layer 20 is formed by dipping the heat sensitive body 11 of the element main body 2 once in a liquid mixture formed of a mixture of the various powders having the coefficients of linear expansion and the particle sizes (d50) shown below and an organic binder, and then drying the heat sensitive body 11. The inner protective layers 20 include a thermistor powder alone; a mixture of the thermistor powder and a Y$_2$O$_3$ powder; a mixture of the thermistor powder and an MgO powder; and a mixture of the thermistor powder and a ZrO powder. The thermistor powder has the same composition as the thermistor forming the heat sensitive body 11.

Glass: 9.1×10$^{-6}$/K

Thermistor powder: 8.0×10$^{-6}$/K, 1.0 μm

Y$_2$O$_3$ powder: 7.2×10$^{-6}$/K, 0.1 μm

In the specimen No. 11, the density (p) of the inner protective layer 20 is about 5% higher than that of the specimen No. 1. In the specimen No. 12, the density of the inner protective layer 20 is about 10% lower than that of the specimen No. 1, and in the specimen No. 13, the density of the inner protective layer 20 is about 15% lower than that of the specimen No. 1. Further, in the specimen No. 14, the volume (V) of the inner protective layer 20 is about 30% higher than that of the specimen No. 1.

To compare with the temperature sensor elements according to Example, a specimen No. 15 (conventional example) of which the inner protective layer and the outer protective layer include a thermistor powder and glass was produced in accordance with Patent Literature 1 and Patent Literature 2, and the rate of change in the resistance value was measured in the same manner as in Example. The amounts (mass %) of the thermistor powder and the glass added are 80% and 20%, respectively.

The measurement result in the conventional example as well as the measurement results in Example are collectively shown in Table 1.

Holding temperature: 900° C.

Atmosphere: Hydrogen 5 vol. %+nitrogen 95 vol. %

Holding time: 10 hours

Resistance value measurement: 25° C.

TABLE 1

| Specimen No. | Inner protective layer 20 | Outer protective layer 30 | ΔR25[%] after a lapse of 10 Hr. (900° C.) | Classification |
|---|---|---|---|---|
| 1 | Thermistor | Glass + Y$_2$O$_3$ | 13.21 | Example |
| 2 | Thermistor | Glass | 12.98 | |
| 3 | Thermistor + Y$_2$O$_3$ | Glass + Y$_2$O$_3$ | 23.33 | |
| 4 | Thermistor + ZrO$_2$ | Glass + Y$_2$O$_3$ | 25.67 | |
| 5 | Thermistor + MgO | Glass + Y$_2$O$_3$ | 28.59 | |
| 6 | Thermistor + Al$_2$O$_3$ | Glass + Y$_2$O$_3$ | 46.35 | |
| 7 | Thermistor + SiO$_2$ | Glass + Y$_2$O$_3$ | 64.52 | |
| 8 | Thermistor + RuO$_2$ | Glass + Y$_2$O$_3$ | 13.41 | |
| 9 | Thermistor + AlN | Glass + Y$_2$O$_3$ | 57.05 | |
| 10 | Thermistor + BN | Glass + Y$_2$O$_3$ | 54.19 | |
| 11 | Thermistor (ρ 5% up) | Glass + Y$_2$O$_3$ | 19.8 | |
| 12 | Thermistor (ρ 10% down) | Glass + Y$_2$O$_3$ | 2.60 | |
| 13 | Thermistor (ρ 15% down) | Glass + Y$_2$O$_3$ | 1.91 | |
| 14 | Thermistor (V 30% up) | Glass + Y$_2$O$_3$ | 5.20 | |
| 15 | Thermistor + Glass | Glass + Y$_2$O$_3$ | 77.05 | Conventional example |

MgO powder: 11×10$^{-6}$/K, 10 μm

ZrO$_2$ powder: 10.5×10$^{-6}$/K, 5 μm

The outer protective layers 30 were formed of a mixture of a Y$_2$O$_3$ powder as an oxide powder and glass, or formed of glass alone. As the glass, crystallized glass was used.

Using the above-described element main bodies 10, the liquid mixtures for the inner protective layers 20, and the liquid mixtures for the outer protective layers 30, 14 types of temperature sensor elements (Example: specimens No. 1 to 14) shown in Table 1 were obtained. Using the obtained temperature sensor elements (specimens No. 1 to 14), the rates of change (ΔR25[%]) in the resistance value under the following conditions were measured.

The amount (mass %) of the thermistor powder added in the inner protective layers 20 of the specimens No. 3 to 10 is 50%, with the balance 50% being a Y$_2$O$_3$ powder, a ZrO$_2$ powder, an MgO powder, an Al$_2$O$_3$ powder, an SiO$_2$ powder, an RuO$_2$ powder, an AlN powder, and a BN powder, respectively.

The amount (mass %) of the glass added in the outer protective layers 30 of the specimens No. 1 and 3 to 14 is 80%, with the balance being a Y$_2$O$_3$ powder.

As shown in Table 1, compared with the specimen No. 15 (conventional example) of which the inner protective layer 20 contains glass, the specimens No. 1 to 14 (Example) of which the inner protective layers 20 do not contain glass can maintain low rates of change in the resistance value.

As for the outer protective layer 30, as the result of the specimen No. 2 shows, a low rate of change in the resistance value can be maintained even when the outer protective layer 30 is formed from glass alone. This also suggests that the stress relieving function of the inner protective layer 20 is fulfilled regardless of the relationship among the coefficients of linear expansion of the heat sensitive body 11, the inner protective layer 20, and the outer protective layer 30.

Second Example

Next, using the specimen No. 1 (Example) and the specimen No. 15, a temperature rise-and-fall cycle test involving repeating the cycle 1000 times and 2000 times was conducted to measure the rates of change (ΔR25[%]) in the resistance value. The results are shown in Table 2.

The outer protective layers 30 of the specimen No. 1 and the specimen No. 15 have the same composition, but the inner protective layers 20 thereof are different from each other in the composition as to whether glass is contained.

The rates of change (ΔR25[%]) in the resistance value in Table 2 show the rate of change in the resistance values before the start of the first rise and fall and after the 1000th temperature rise and fall (1000 cycles), and the rate of change in the resistance values before the start of the first rise and fall and after the 2000th temperature rise and fall (2000 cycles).

Raised and lowered temperatures, number of repetitions (cycles): 25° C. to 1000° C., 1000 times and 2000 times
Atmosphere: air
Measurement of resistance value: measured at 25° C. after 1000 times of rise and fall and after 2000 times of rise and fall

TABLE 2

| Specimen No. | Inner protective layer 20 | Outer protective layer 30 | ΔR25[%] 1000 cycles | ΔR25[%] 2000 cycles | Remarks |
|---|---|---|---|---|---|
| 1 | Thermistor | Glass + $Y_2O_3$ | 3.81 | 2.97 | Example |
| 15 | Thermistor + glass | Glass + $Y_2O_3$ | 4.83 | 6.83 | Conventional example |

It has been confirmed from Table 2 that also in the cycle test, the rate of change in the resistance value of the specimen No. 1 (Example) of which the inner protective layer 20 does not contain glass is low. In particular, it is worth noting that the specimen No. 1 exhibits a lower rate of change in the resistance value as the number of cycles increases.

Third Example

Next, using the specimen No. 1 (Example), the specimen No. 12 (Example), and the specimen No. 15 (conventional example), the rates of change (ΔR25[%]) in the resistance value were measured in the same manner as in First Example except for the holding temperature being 1050° C. The results are shown in Table 3.

TABLE 3

| Specimen No. | Inner protective layer 20 | Outer protective layer 30 | ΔR25[%] after a lapse of 10 Hr. (1050° C.) | Remarks |
|---|---|---|---|---|
| 1 | Thermistor | Glass + $Y_2O_3$ | 51.87 | Example |
| 12 | Thermistor (ρ 10% down) | Glass + $Y_2O_3$ | 15.70 | |
| 15 | Thermistor + Glass | Glass + $Y_2O_3$ | 426 | Conventional example |

Compared with the specimen No. 15 according to the conventional example, the specimen No. 1 and the specimen No. 12 according to Example can achieve dramatically lower rates of change in the resistance value at the holding temperature of 1050° C.

While the preferred embodiment of the present invention has been described above, the configurations introduced in the above embodiment may be selectively adopted or substituted by other configurations without departing from the scope of the present invention.

REFERENCE SIGNS LIST

1 Temperature sensor element
2 Element main body
3 Protective layer
11 Heat sensitive body
13 Electrode
15 Lead wire
17 Connection electrode
20 Inner protective layer
30 Outer protective layer

The invention claimed is:
1. A temperature sensor element comprising:
a heat sensitive body including a thermistor sintered body of which electrical characteristics change with temperature;
a pair of lead wires connected to the heat sensitive body through electrodes; and
a protective layer covering the heat sensitive body,
wherein the protective layer has an inner protective layer covering the heat sensitive body and an outer protective layer covering and contacting an entire outer periphery of the inner protective layer,
wherein the inner protective layer is formed of an aggregate of particles that are chemically stable with respect to the thermistor sintered body and made of non-metal,
wherein the particles forming the aggregate undergo positional shift relative to one another under thermal stress from the outer protective layer,
wherein the outer protective layer holds the inner protective layer, and
wherein the inner protective layer does not comprise glass, and has a density less than or equal to 60% of a density of the thermistor sintered body.
2. The temperature sensor element according to claim 1, wherein a filling rate of the particles in the inner protective layer is 88% or less.
3. The temperature sensor element according to claim 2, wherein the aggregate of the inner protective layer includes one or two or more of oxide particles, carbide particles, nitride particles, and boride particles.
4. The temperature sensor element according to claim 3, wherein the aggregate of the inner protective layer includes thermistor particles having the same composition as the thermistor sintered body.

5. The temperature sensor element according to claim 2, wherein the aggregate of the inner protective layer includes thermistor particles having the same composition as the thermistor sintered body.

6. The temperature sensor element according to claim 1, wherein the aggregate of the inner protective layer includes one or two or more of oxide particles, carbide particles, nitride particles, and boride particles.

7. The temperature sensor element according to claim 6, wherein the aggregate of the inner protective layer includes thermistor particles having the same composition as the thermistor sintered body.

8. The temperature sensor element according to claim 1, wherein the aggregate of the inner protective layer includes thermistor particles having the same composition as the thermistor sintered body.

9. The temperature sensor element according to claim 1, wherein the outer protective layer holds the inner protective layer to maintain a shape of the inner protective layer.

10. A manufacturing method of a temperature sensor element including a heat sensitive body including a thermistor sintered body of which electrical characteristics change with temperature, a pair of lead wires connected to the heat sensitive body through electrodes, and a protective layer covering the heat sensitive body, the manufacturing method comprising:
   a first step of providing an inner protective layer that covers the heat sensitive body; and
   a second step of providing an outer protective layer that covers and contacts an entire outer periphery of the inner protective layer,
   wherein, in the first step, the inner protective layer formed of an aggregate of particles that are chemically stable with respect to the thermistor sintered body and made of non-metal is provided,
   wherein the particles forming the aggregate undergo positional shift relative to one another under thermal stress from the outer protective layer,
   wherein the outer protective layer holds the inner protective layer, and
   wherein the inner protective layer does not comprise glass and has a density less than or equal to 60% of a density of the thermistor sintered body.

11. The method according to claim 10, wherein the outer protective layer holds the inner protective layer to maintain a shape of the inner protective layer.

\* \* \* \* \*